United States Patent Office 3,100,137
Patented Aug. 6, 1963

3,100,137
PRODUCTION OF MANGANESE PENTA-
CARBONYL HYDRIDE
Walter Hieber, Munich, and Gerhard Wagner, Burgkir-
chen (Alz), Germany, assignors to Badische Anilin- &
Soda-Fabrik Aktiengesellschaft, Ludwigshafen (Rhine),
Germany
No Drawing. Filed Mar. 10, 1959, Ser. No. 798,336
Claims priority, application Germany Mar. 13, 1958
5 Claims. (Cl. 23—14)

This invention relates to the production of manganese pentacarbonyl hydride.

We have found that manganese pentacarbonyl hydride can be especially advantageously produced by dissolving manganese pentacarbonyl in an indifferent, polar solvent, adding a medium which contains free H-ions and converting the manganese pentacarbonyl to manganese pentacarbonyl hydride by using a reducing agent.

The manganese pentacarbonyl may be dissolved first in the indifferent solvent, i.e. an inert organic solvent which does not react with the initial materials and the reaction products. As solvents there are suitable polar organic liquids, for example, alcohols, such as methyl alcohol, ethyl alcohol, propyl alcohol and the like, ethers, such as for example, diethyl ether, dibutyl ether, tetrahydrofurane, glycol ether, and also dimethyl formamide, dioxane and the like.

The solution thus obtained is then mixed with a medium which contains free H-ions. For this there are suitable for example, acids, especially such acids whose acid strength is greater than that of the manganese pentacarbonyl hydride. Thus, all acids may be used, for example, whose dissociation constant K is greater than $5 \times 10^{-7}$, i.e. there are suitable dilute sulfuric acid, hydrochloric acid as well as organic acids, for example, formic acid and acetic acid. Acid salts may also be used such as for example, sodium hydrosulfate, sodium dihydrophosphate or salts which react with water to form acids, such as for example, $AlCl_3$.

Alternatively the manganese pentacarbonyl may be dissolved in an indifferent, polar solvent to which free H-ions have already been added, such as alcoholic, for example methanolic, hydrochloric acid, ether combined with hydrochloric acid and so on.

As reducing agents, there may be used metals, such as for example magnesium and aluminum, metal alloys, such as for example, amalgams, as well as compounds which have a reducing action, for example rongalite, dithionite and formamidine sulfinic acid.

The redox-normal-potential must be greater than $-0.7$ volt.

The process for the production of manganese pentacarbonyl hydride may take place at normal or elevated temperature, preferably at a temperature between 5° C. and 100° C., or at normal or increased pressure.

The yield of manganese pentacarbonyl hydride amounts to almost 100%.

The following example will further illustrate this invention but the invention is not limited to this example.

Example 10 grams of manganese pentacarbonyl are dissolved at room temperature in 250 cubic centimeters of methanolic hydrochloric acid. To the solution obtained there are added 10 grams of metallic magnesium in powder form. The gaseous manganese pentacarbonyl hydride which escapes is collected in a cooled receiver.

Instead of methanol other short chain saturated monoalcohols, instead of hydrochloric acid other acids and instead of magnesium aluminum or other reducing metals or metal alloys can be employed.

We claim:
1. A process for the production of manganese pentacarbonyl hydride which comprises interacting manganese pentacarbonyl in the presence of an inert polar organic solvent with an acid having a dissociation constant greater than $5 \times 10^{-7}$ and with a metal reducing agent selected from the group consisting of magnesium and aluminum.
2. A process as claimed in claim 1 wherein the inert solvent is a short chain saturated monoalcohol having 1 to 3 carbon atoms.
3. A process as claimed in claim 1 wherein the reducing agent is magnesium.
4. A process for the production of manganese pentacarbonyl hydride which comprises interacting manganese pentacarbonyl in the presence of methyl alcohol with hydrochloric acid as a medium containing free H-ions and with magnesium as a reducing agent.
5. A process as claimed in claim 4 carried out at a temperature between 5° C. and 100° C.

References Cited in the file of this patent
UNITED STATES PATENTS 2,088,997 Max _____ Aug. 3, 1937
2,940,832 Natta et al. _____ June 14, 1960
2,967,087 Coffield _____ Jan. 3, 1961

OTHER REFERENCES

German printed application, 1,041,023, October 16, 1958.

Lange: "Handbook of Chemistry," 1944, 5th Edition, pages 1093–1094.

Hieber et al.: "Zietschrift für Naturforschung," volume 12B, pages 478–479 (1957).

Remy: "Treatise on Inorganic Chemistry," 1956, volume II, pages 356–357.

Brimm et al.: "Journal of the American Chemical Society," vol. 76, pages 3831–3833 (1954).

Coleman et al.: "Journal of the American Chemical Society," vol. 58, pages 2160–2163 (1936).